United States Patent
Shin

(10) Patent No.: US 6,683,957 B1
(45) Date of Patent: *Jan. 27, 2004

(54) DIGITAL IMAGE CODING/DECODING APPARATUS AND METHOD FOR CORRECTING DISTORTED DATA IN TRANSMITTED SIGNALS THAT USE WATERMARKING

(75) Inventor: Hyun-doo Shin, Kyungki-do (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 09/345,729

(22) Filed: Jul. 1, 1999

Related U.S. Application Data

(60) Provisional application No. 60/091,540, filed on Jul. 1, 1998.

(51) Int. Cl.[7] .............................. H04N 7/08; H04N 7/30; H04N 7/13
(52) U.S. Cl. .................. 380/54; 713/176; 713/179; 382/100; 382/128; 382/232; 382/255; 382/275; 382/277; 324/309; 375/240.11; 600/437
(58) Field of Search .............................. 382/100, 128, 382/232, 255, 275–277; 324/309; 375/240.11; 600/437; 380/54; 713/176, 179

(56) References Cited

U.S. PATENT DOCUMENTS

| | | | |
|---|---|---|---|
| 4,943,855 A | * 7/1990 | Bheda et al. | 358/133 |
| 5,495,292 A | * 2/1996 | Zhang et al. | 348/407 |
| 5,689,562 A | * 11/1997 | Hassan et al. | 380/9 |
| 6,240,121 B1 | * 5/2001 | Senoh | 375/130 |
| 6,330,672 B1 | * 12/2001 | Shur | 713/176 |
| 6,415,042 B1 | * 7/2002 | Shin | 382/100 |
| 2002/0016916 A1 | * 2/2002 | Natarajan | 713/179 |

OTHER PUBLICATIONS

A.Z. Tirkel, R.G. Van Schyndel, T.E. Hall, C.F. Osborne, Secure Arrays for Digital Watermarking, Monash University, Clayton, Australia.*

Mihai P. Mitrea et al., Spread Spectrum Watermarking method for Image databases, POLIITECHNICA University of Bucharest Romainia.*

(List continued on next page.)

*Primary Examiner*—Ayaz Sheikh
*Assistant Examiner*—Taghi T. Arani
(74) *Attorney, Agent, or Firm*—Sughrue Mion, PLLC

(57) ABSTRACT

Digital image coding/decoding apparatus using watermarking, and methods thereof are provided. The digital image coding apparatus includes a discrete wavelet transform portion for performing discrete wavelet transform on a host image to be transmitted thereon, thereby outputting M×M discrete wavelet coefficients where M is a predetermined positive integer, a significant coefficient extraction portion for extracting a predetermined percentile of upper significant coefficients among M×M wavelet coefficients, a pseudo-random number generator for generating pseudo-random numbers in accordance with a predetermined rule corresponding to an encryption code, and a coefficient replacement/combination portion for obtaining replacing location data representing the N×N replacing locations, where N is a predetermined positive integer smaller than M, replacing and combining coefficients corresponding to N×N replacing locations selected among M×M wavelet coefficients with N×N significant wavelet coefficients. Since a distorted host image transmitted from a severely noisy environment is corrected using the current image, the flow of information is continuous. Also, even when the image is abruptly changed, an error in correcting the image is not generated.

18 Claims, 4 Drawing Sheets

OTHER PUBLICATIONS

Mihai P. Mitrea et al., Robust Watermarking Method for Colour Still Image Databases, POLIITECHNICA University of Buchares Romainia.*

"A Secure, Robust Watermark for Multimedia", Lecture Notes in Computer Science [sic] 1174, Information Hididing [sic]First International Workshop Cambridge, U.K., May 1996.

"PN Array Image Transparency Cryptography", The 1997 Symposium on Cryptography and Information Security Fukuoka, Japan, SCIS '97–26B, Jan. 29, 1997.

* cited by examiner

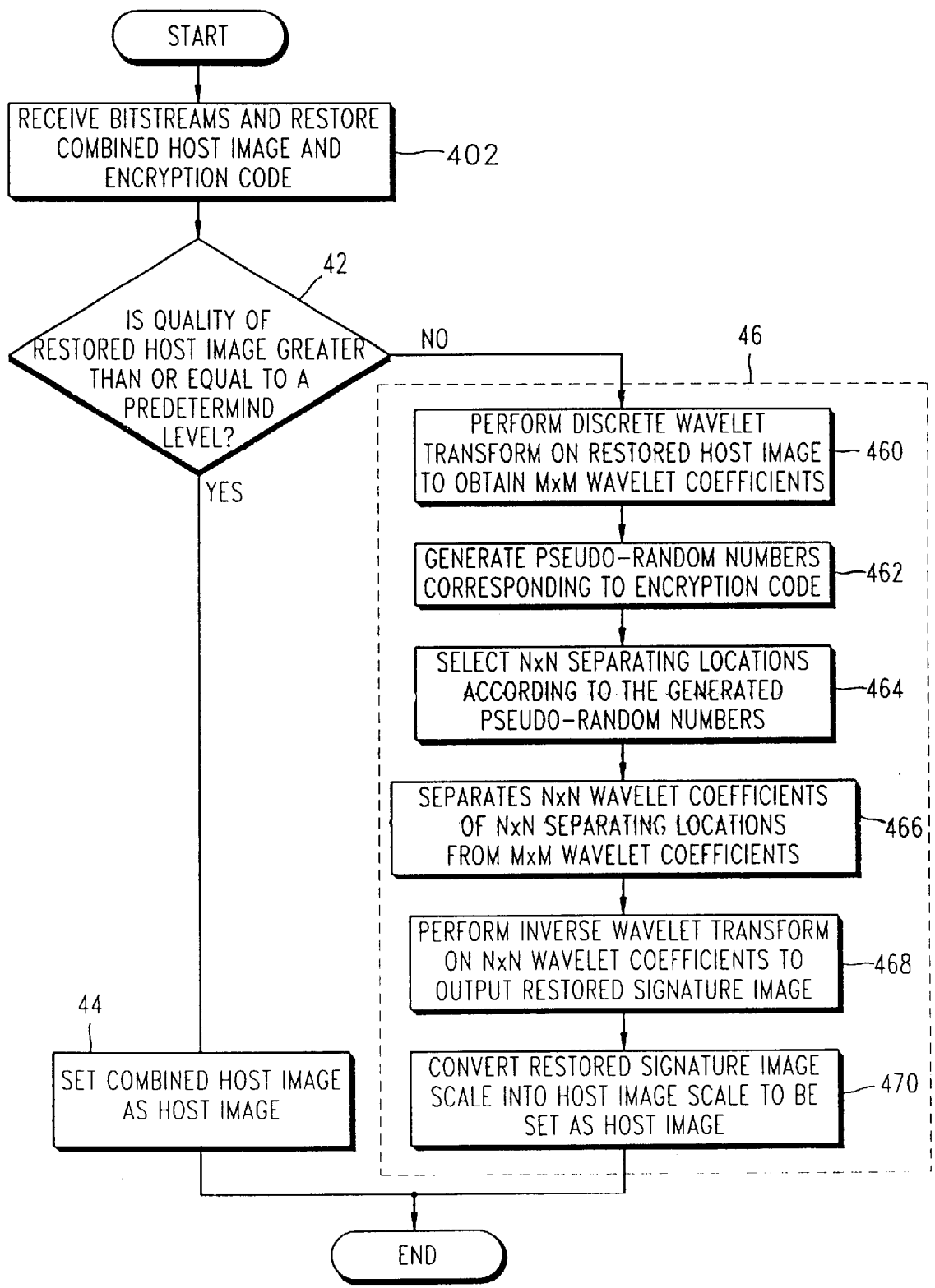

DIGITAL IMAGE CODING/DECODING APPARATUS AND METHOD FOR CORRECTING DISTORTED DATA IN TRANSMITTED SIGNALS THAT USE WATERMARKING

RELATED APPLICATION DATA

This application claims priority from the U.S. provisional patent application entitled "Method for Evaluating Image Quality Using Watermarking", U.S. Ser. No. 60/091,540, filed by the applicant of the present invention on Jul. 1, 1998. The content of the provisional patent application is incorporated herein by reference.

BACKGROUND OF THE INVENTION

1. Field of the Invention

The present invention relates to a digital image coding apparatus using watermarking, a decoding apparatus, and coding and decoding methods, and more particularly, to a digital image coding apparatus which allows continuous flow of information by correcting a distorted host image using a signature image when distortion of the host image is severe, a corresponding decoding apparatus, and corresponding encoding and decoding methods.

2. Description of the Related Art

Watermarking is a technology in which an image to be transmitted is transmitted together with an encrypted image for the purpose of providing security and authenticating rights. A receiver side receives the image to be transmitted (hereinafter to be referred to as a host image) together with the encryption image transmitted with confidence (hereinafter to be referred to as a signature image). The signature image is decoded by a special decryption apparatus.

FIG. 1 is a conceptual block diagram illustrating a conventional digital image codec apparatus 1 for generating a watermarked image 8 and extracting a signature image 14 from the watermarked image. In the conventional digital image codec apparatus, during encoding, a DCT (Discrete Cosine Transform) 2 is performed on a host image 3 and a secret signature image 4 to be transmitted, thereby extracting DCT coefficients for the respective images. The DCT coefficients are encoded by an encoder 5. Here, the DCT coefficient components of the signature image 4 are encoded by a separate encryption encoder 6 that controls the encryption operation. In such a manner, the DCT coefficients of the host image 3 and the DCT coefficients of the signature image 4 inserted into the DCT coefficients of the host image 3 after being encoded, can be transmitted. An IDCT (Inverse Discrete Cosine Transform) 7 is performed on the DCT coefficients 2A of the host image and the DCT coefficients 2B of the signature image inserted into the DCT coefficients of the host image, thereby obtaining a watermarked image 8 in which only the host image is visible, while the signature image is not visible.

The signature image 4 watermarked on the host image 3 is decoded by a special decryption apparatus to then be restored. During restoration, IDCT is performed on a watermarked image, thereby extracting DCT coefficients thereof. Next, the extracted DCT coefficients 2A obtained by performing DCT on the original host image 3, are separated from the DCT coefficients of the watermarked image at subtractor 10, thereby extracting DCT coefficient components of the encoded signature image. Then, a decoder 11 decodes the DCT coefficient components of the encoded signature image. Here, the encryption decoder 11 performs a control operation for the decryption process. The DCT coefficients of the signature image decoded by the decryption control operation are again IDCT-performed 13, thereby restoring the signature image.

As described above, in the conventional digital image codec apparatus using watermarking, if it is determined that the current host image is severely distorted, the current image is corrected by a decoding unit using the previous host image. However, if the previous image, rather than the current image, is used in correcting the image, the flow of information becomes discontinuous. Also, when the image is abruptly changed, an error in correcting the image may be generated.

SUMMARY OF THE INVENTION

It is an object of the present invention to provide a digital image coding/decoding apparatus and method thereof, which can correct a distorted host image transmitted from a severely noisy environment by using the current image.

To achieve the above object of the present invention, there is provided a digital image coding apparatus including a discrete wavelet transform portion for performing discrete wavelet transform on a host image to be transmitted thereon, thereby outputting M×M discrete wavelet coefficients where M is a predetermined positive integer, a significant coefficient extraction portion for extracting a predetermined percentile of upper significant coefficients among M×M wavelet coefficients, a pseudo-random number generator for generating pseudo-random numbers in accordance with a predetermined rule corresponding to an encryption code, and a coefficient replacement/combination portion for obtaining replacing location data representing the N×N replacing locations, where N is a predetermined positive integer smaller than M, replacing and combining coefficients corresponding to N×N replacing locations selected among M×M wavelet coefficients with N×N significant wavelet coefficients.

Also, the digital image coding apparatus may further include an inverse discrete wavelet transform portion for performing inverse discrete wavelet transform on the replaced M×M wavelet coefficients to generate a combined host image, and a compression portion for compressing the combined host image and the encryption code.

Also, the predetermined positive integer N is preferably smaller than or equal to 0.5M.

According to another aspect of the present invention, there is provided a digital image decoding apparatus for decoding bitstreams coded using watermarking, the apparatus including a decompression portion for decompressing the compressed bitstreams to restore a host image and a predetermined encryption code, an image quality evaluation portion for evaluating the quality of the restored host image and generating a control signal that has a first logic state if the quality of the restored host image is less than a predetermined level, and generating a second control signal that has a second logic state if not, a discrete wavelet transform portion for performing discrete wavelet transform on the restored host image in response to the first logic state control signal to obtain M×M wavelet coefficients, M being a predetermined positive integer, a pseudo-random number generator for generating pseudo-random numbers in accordance with a rule corresponding to the restored encryption code, a coefficient separating portion for obtaining separating location data representing the N×N replacing locations using the pseudo-random numbers, N being another predetermined integer smaller than M, and separating wavelet coefficients of the N×N separating locations from M×M wavelet coefficients, an inverse discrete wavelet transform portion for performing is inverse discrete wavelet transform on the N×N wavelet coefficients to generate a restored signature image, an image scale conversion portion for increasing the scale of the restored signature image into that of the host image, and an image selection portion for selecting a scale-increased signature image in response to the first logic state control signal, and selecting the restored host image in response to the second logic state control signal to output a selected image as a host image.

According to still another aspect of the present invention, there is provided a digital image codec apparatus using watermarking, the apparatus including a first discrete wavelet transform portion for performing a discrete wavelet transform on a host image to be transmitted thereon, thereby outputting M×M discrete wavelet coefficients where M is a predetermined positive integer, a significant coefficient extraction portion for extracting a predetermined percentile of upper significant coefficients among M×M wavelet coefficients, a first pseudo-random number generator for generating pseudo-random numbers in accordance with a predetermined rule corresponding to an encryption code, a coefficient replacement/combination portion for obtaining replacing location data representing the N×N replacing locations, where N is a predetermined positive integer smaller than M, replacing and combining coefficients corresponding to the selected N×N replacing locations among M×M wavelet coefficients with N×N significant wavelet coefficients, a first inverse discrete wavelet transform portion for performing inverse discrete wavelet transform on the replaced M×M wavelet coefficients to generate a combined host image, a compression portion for compressing the combined host image and the encryption code, a decompression portion for decompressing the compressed bitstreams to restore the host image and the encryption code, an image quality evaluation portion for evaluating the quality of the restored host image and generating a control signal becoming a first logic state if the quality of the restored host image is less than a predetermined level, and becoming a second logic state if not, a second discrete wavelet transform portion for performing discrete wavelet transform on the restored host image in response to the first logic state control signal to obtain M×M wavelet coefficients, M being a predetermined positive integer, a second pseudo-random number generator for generating pseudo-random numbers in accordance with a rule corresponding to the restored encryption code, a coefficient separating portion for obtaining separating location data representing the N×N replacing locations using the pseudo-random numbers, N being another predetermined integer smaller than M, and separating N×N wavelet coefficients corresponding to the N×N separating locations from M×M wavelet coefficients, a second inverse discrete wavelet transform portion for performing inverse discrete wavelet transform on the M×M wavelet coefficients to generate a restored signature image, an image scale conversion portion for increasing the scale of the restored signature image into that of the host image, and an image selection portion for selecting a scale-increased signature image in response to the first logic state control signal, and selecting the restored host image in response to the second logic state control signal to output a host image.

According to still further another aspect of the present invention, there is provided a digital image coding method using watermarking, the method including the steps of (a) performing a discrete wavelet transform on a host image to be transmitted thereon, thereby outputting M×M discrete wavelet coefficients where M is a predetermined positive integer, (b) extracting a predetermined percentile of upper significant coefficients among M×M wavelet coefficients, (c) generating pseudo-random numbers in accordance with a rule corresponding to a predetermined encryption code, and (d) obtaining replacing location data representing the replacing locations of N×N pixels, where N is a predetermined positive integer smaller than M, and (e) replacing and combining coefficients of N×N replacing locations selected among M×M wavelet coefficients with N×N significant wavelet coefficients.

According to still yet another aspect of the present invention, there is provided a digital image decoding method for decoding bitstreams coded using watermarking, the method including the steps of (a) evaluating the quality of a combined host image and determining whether the quality of the combined host image is greater than or equal to a predetermined level, (b) setting the combined host image as a host image if it is determined in step (a) that the quality of the combined host image is greater than or equal to a predetermined level, and (c) setting as a host image a signature image secretly embedded in the combined host image if it is determined in step (a) that the quality of the combined host image is lower than a predetermined level.

Finally, the invention comprises a program media having stored thereon a computer program embodying the foregoing methods.

BRIEF DESCRIPTION OF THE DRAWINGS

The above objective and advantages of the present invention will become more apparent by describing in detail a preferred embodiment thereof with reference to the attached drawings in which:

FIG. 4 is a flow chart showing the steps of a digital image decoding method according to the present invention.

DESCRIPTION OF THE PREFERRED EMBODIMENTS

Figure 1:
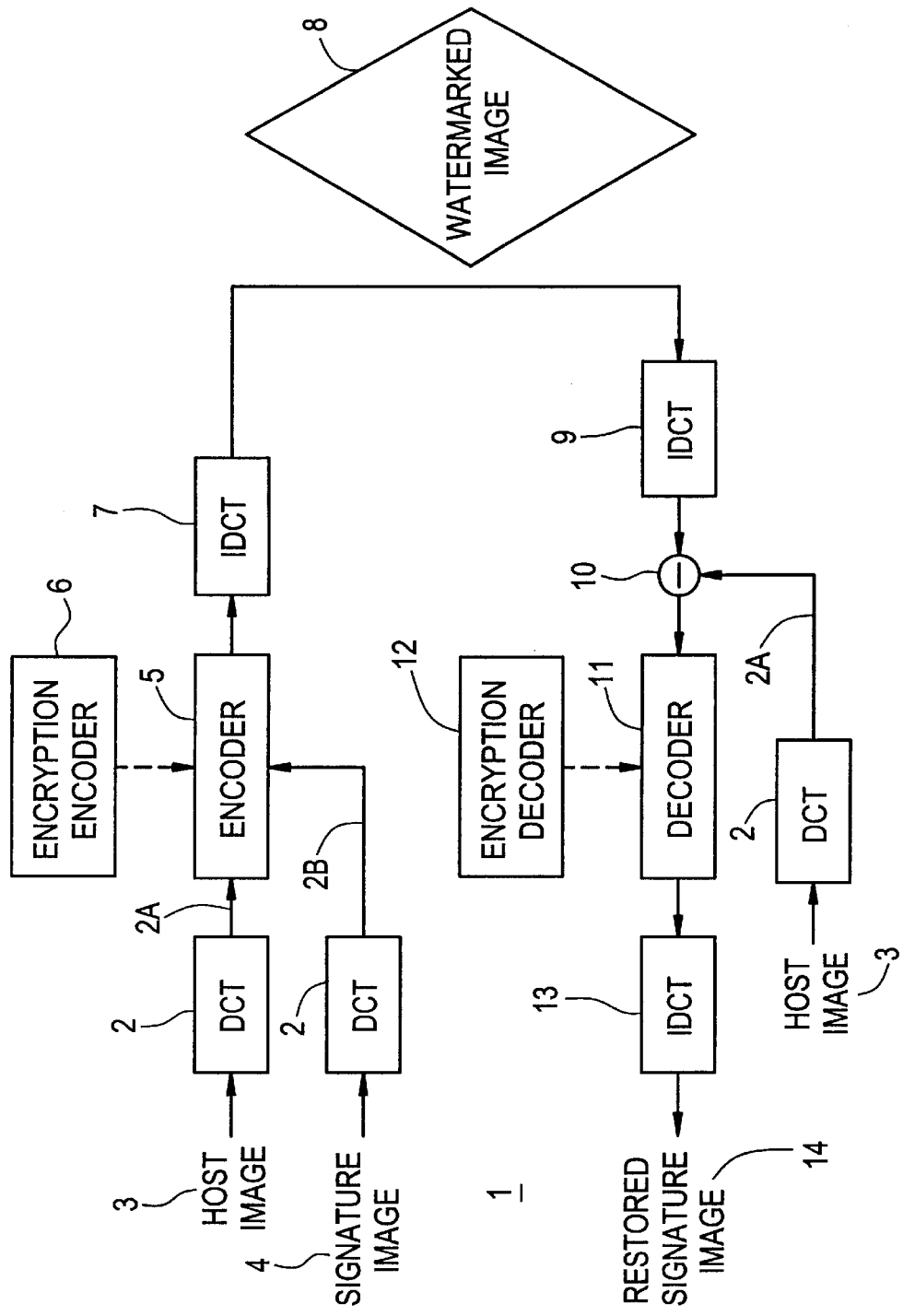
FIG. 1 is a conceptual block diagram illustrating a conventional digital image codec apparatus for generating a watermarked image and extracting a signature image from the watermarked image.
Figure 2:
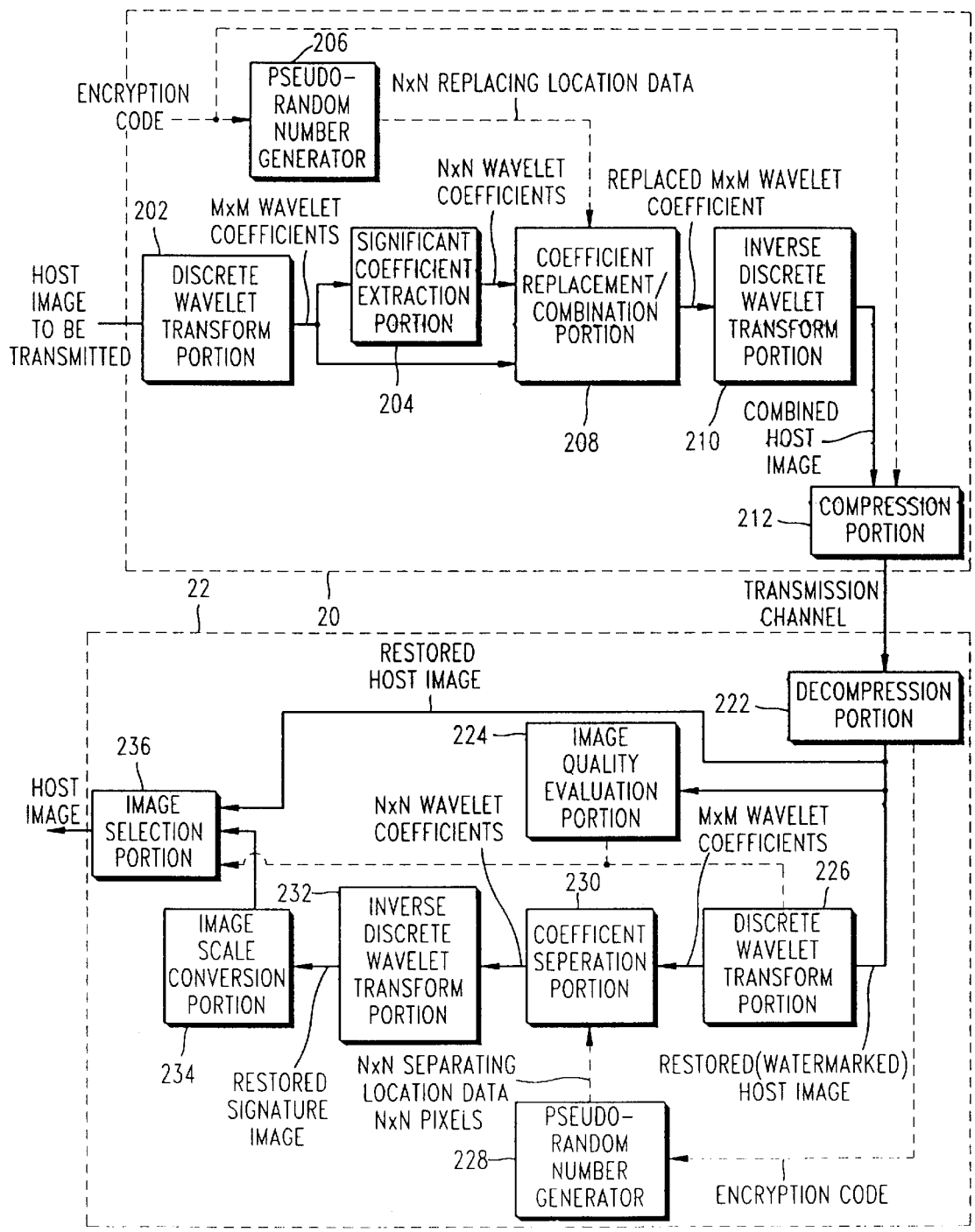
FIG. 2 is a block diagram illustrating a digital image codec apparatus according to the present invention.

Referring to FIG. 2, a digital image codec apparatus according to the present invention includes an encoding unit 20 and a decoding unit 22. The encoding unit 20 includes a discrete wavelet transform portion 202, a significant coefficient extraction portion 204, a pseudo-random number generator 206, a coefficient replacement/combination portion 208, an inverse discrete wavelet transform portion 210 and a compression portion 212. Also, the decoding unit 22 includes a decompression portion 222, an image quality evaluation portion 224, a discrete wavelet transform portion 226, a pseudo-random number generator 228, a coefficient separating portion 230, an inverse discrete wavelet transform portion 232, an image scale conversion portion 234 and an image selection portion 236.

Figure 3:
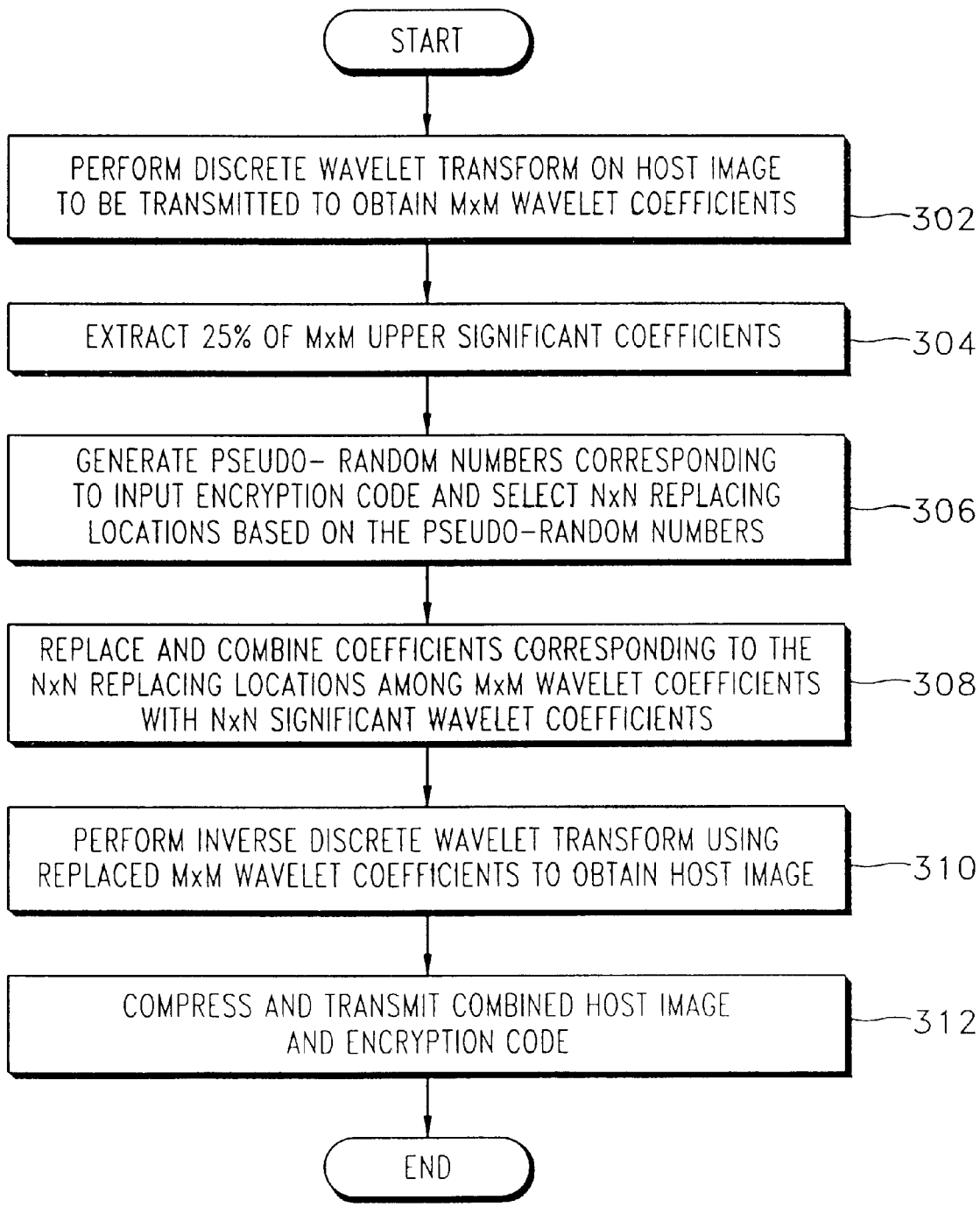
FIG. 3 is a flow chart showing the steps of a digital image coding method according to the present invention.

First, the operation of the encoding unit 20 will be described with reference to FIGS. 2 and 3.

The discrete wavelet transform portion 202 receives a host image to be transmitted, and performs discrete wavelet transform (step 302) to obtain discrete wavelet coefficients. As known in the art, the discrete wavelet coefficients consist of a square matrix. In this embodiment, it is assumed that the discrete wavelet coefficients are M×M, M being a predetermined positive integer.

The significant coefficient extraction portion 204 extracts 25% of the upper significant coefficients among M×M wavelet coefficients (step 304).

The pseudo-random number generator 206 generates pseudo-random numbers in accordance with a rule corresponding to a predetermined encryption code input at a user's option, and the coefficient replacement/combination portion 208 selects N×N replacing locations (step 306). Also, the coefficient replacement/combination portion 208 replaces and combines selected coefficients of N×N replacing locations among M×M wavelet coefficients with N×N significant wavelet coefficients (step 308). Here, since 25% of upper significant coefficients are selected among M×M wavelet coefficients in step 304, N is set to one half of M, that is, 0.5M. In view of the characteristics of watermarking, N is preferably smaller than or equal to 0.5M in consideration of the influence on the original host image. The significant wavelet coefficients of the host image to be transmitted are randomly distributed as the wavelet coefficients of the signature image in the combined host image.

The inverse discrete wavelet transform portion 210 performs an inverse discrete wavelet transform on the replaced M×M wavelet coefficients to generate a combined host image (step 310). Since the combined host image has a signature image embedded therein using watermarking, it is not significantly different from the original host image, and the signature image is not discernible with the naked eye.

The compression portion 212 compresses the combined host image and the encryption code to output compressed bitstreams (step 312). Here, the encryption code is also compressed for the purpose of selecting separating locations at the same interval with the replacing locations used during encoding.

As described above, the encoding unit 20 pseudo-randomly rearranges upper significant wavelet coefficients of a host image to be transmitted in the wavelet coefficients themselves of the host image. Thus, significant parts of the host image are watermarked within the host image itself.

The host image watermarked by the encoding unit 20 is decoded by the decoding unit 22.

Now, the operation of the decoding unit 22 will be described with reference to FIGS. 2 and 4.

The decompression portion 222 decompresses the compressed bitstreams to restore the host image and the encryption code (step 402). The encryption code is for determining the generation rule of the pseudo-random numbers used for replacement and combination of coefficients in the encoding unit 20. In the decoding unit 22, the generation rule of the pseudo-random numbers used for separation of coefficients to be described later is determined by the encryption code.

The image quality evaluation portion 224 evaluates the quality of the restored host image and determines whether or not the quality of the restored host image is greater than or equal to a predetermined level (step 42). Thus, the image quality evaluation portion 224 generates a control signal becoming logic "high" if the quality of the restored host image is less than a predetermined level, and, becoming logic "low" if not. The evaluation of image quality can be performed in the same manner as distortion evaluation, for example.

The discrete wavelet transform portion 226 performs discrete wavelet transform on the restored host image in response to the logic "high" control signal to obtain M×M wavelet coefficients, M being a predetermined positive integer (step 460).

The pseudo-random number generator 228 generates pseudo-random numbers in accordance with a rule corresponding to the restored encryption code (step 462). The pseudo-random number generator 228 performs the same operation as the pseudo-random number generator 206 of the encoding unit 20. Thus, if the is restored encryption code, that is, the same encryption code as that used in the encoding unit 20, is input, the pseudo-random numbers are generated in accordance with the same rule as that used in the encoding unit 20.

The coefficient separating portion 230 selects N×N separating locations using the pseudo-random numbers, N being another predetermined integer smaller than M (step 464). Also, the coefficient separating portion 230 separates N×N wavelet coefficients of the N×N separating locations from M×M wavelet coefficients (step 466). Here, N is determined during coefficient replacement and combination in the encoding unit 20, and is preferably smaller than or equal to 0.5M.

The inverse discrete wavelet transform portion 232 performs inverse discrete wavelet transform on the N×N wavelet coefficients to generate a restored signature image.

The image scale conversion portion 234 converts the scale of the restored signature image into that of the host image (step 470). The scale-converted signature image is set as a host image.

Finally, an image selection portion 236 selects a scale-increased signature image in response to a logic "high" control signal and selects the restored host image in response to a logic "low" control signal to output the selected image as a host image.

Therefore, the decoding unit 22 sets as a host image the combined host image if the quality of the restored host image is greater than or equal to a predetermined level (step 44) to then be output. On the other hand, if the quality of the restored host image is less than a predetermined level, the decoding unit 22 restores the signature image embedded in the host image in secrecy and sets the restored signature image as a host image (step 46) to then be output.

As described above, according to the present invention, since a distorted host image transmitted from a severely noisy environment is corrected using the current image, the flow of information is continuous. Also, even when the image is abruptly changed, an error in correcting the image is not generated.

Also, the digital image coding and decoding units of the digital image codec apparatus according to the present invention can be implemented separately by a digital image coding apparatus and a digital image decoding apparatus.

The digital image coding and decoding methods disclosed herein can be embodied in and performed using a computer program. Also, the methods can be implemented by a general-use digital computer for operating a program on a storage media, where the storage employs any of electronic, magnetic or optical media conventionally used to permit access to the program by the computer. In particular, the medium may include a magnetic recording medium such as a floppy disk or a hard disk, and an optical recording medium such as a CD-ROM or a DVD. Also, such functional programs, codes and code segments can be easily generated by a programmer in the art to which the present invention is pertinent, without the use of undue experimentation.

While the present invention has been described in accordance with certain preferred embodiments, it is not limited thereto, and the applicant intends to obtain protection for the full scope of the invention as defined by the appended claims, in accordance with applicable law.

What is claimed is:

1. A computer program product for a digital image coding apparatus having a computer readable medium with instructions to enable the apparatus to use watermarking, the instructions comprising:

a discrete wavelet transform portion of the instructions operative to perform a discrete wavelet transform on a host image to be transmitted thereon, thereby outputting M×M discrete wavelet coefficients where M is a predetermined positive integer;

a significant coefficient extraction portion of the instructions operative to extract, in order of significance, a predetermined percentile of the M×M wavelet coefficients, beginning with the most significant coefficient;

a pseudo-random number generator operative to generate pseudo-random numbers in accordance with a predetermined rule corresponding to an encryption code; and a coefficient replacement/combination portion of the instructions operative to obtain replacing location data representing the N×N replacing locations, where N is a predetermined positive integer smaller than M, and to replace and combine coefficients corresponding to N×N replacing locations selected among M×M wavelet coefficients with N×N significant wavelet coefficients.

2. The computer program product for a digital image coding apparatus according to claim 1, the instructions further comprising:

an inverse discrete wavelet transform portion of the instructions operative to perform an inverse discrete wavelet transform on the replaced M×M wavelet coefficients to generate a combined host image; and a compression portion of the instructions operative to compress the combined host image and the encryption code.

3. The computer program product for a digital image coding apparatus according to claim 1, wherein the predetermined positive integer N is smaller than or equal to 0.5M.

4. A computer program product for a digital image decoding apparatus having a computer readable medium with instructions to enable the apparatus to decode bitstreams coded using watermarking, the instructions comprising:

a decompression portion of the instructions operative to decompress the compressed bitstreams to restore a host image and a predetermined encryption code;

an image quality evaluation portion of the instructions operative to evaluate the quality of the restored host image and generate a first control signal if the quality of the restored host image is less than a predetermined level, and generate a second control signal if the quality of the restored host image is not less than the predetermined level;

a discrete wavelet transform portion of the instructions operative to perform a discrete wavelet transform on the restored host image in response to the first logic state control signal to obtain M×M wavelet coefficients, M being a predetermined positive integer;

a pseudo-random number generator for generating pseudo-random numbers in accordance with a rule corresponding to the restored encryption code;

a coefficient separating portion of the instructions operative to obtain separating location data representing the N×N replacing locations using the pseudo-random numbers, N being another predetermined integer smaller than M, and to separate N×N wavelet coefficients of the N×N separating locations from M×M wavelet coefficients;

an inverse discrete wavelet transform portion of the instructions operative to perform inverse discrete wavelet transform on the N×N wavelet coefficients to generate a restored signature image;

an image scale conversion portion of the instructions operative to increase the scale of the restored signature image into that of the host image; and an image selection portion of the instructions operative to select a scale-increased signature image in response to the first control signal, and select the restored host image in response to the second control signal to output a selected image as a host image.

5. The computer program product for a digital image decoding apparatus according to claim 4, wherein the predetermined positive integer N is smaller than or equal to 0.5M.

6. A computer program product for a digital image codec apparatus having a computer readable medium with instructions to enable the apparatus to use watermarking, the instructions comprising:

a first discrete wavelet transform portion of the instructions operative to performing discrete wavelet transform on a host image to be transmitted thereon, thereby outputting M×M discrete wavelet coefficients where M is a predetermined positive integer;

a significant coefficient extraction portion of the instructions operative to extract, in order of significance, a predetermined percentile of the M×M wavelet coefficients, beginning with the most significant coefficient;

a first pseudo-random number generator operative to generate pseudo-random numbers in accordance with a predetermined rule corresponding to an encryption code;

a coefficient replacement/combination portion of the instructions operative to obtaining replacing location data representing the N×N replacing locations, where N is a predetermined positive integer smaller than M, and replace and combine coefficients corresponding to the selected N×N replacing locations among M×M wavelet coefficients with M×M significant wavelet coefficients;

a first inverse discrete wavelet transform portion of the instructions operative to perform an inverse discrete wavelet transform on the replaced M×M wavelet coefficients to generate a combined host image;

a compression portion of the instructions for compressing the combined host image and the encryption code;

a decompression portion of the instructions for decompressing the compressed bitstreams to restore the host image and the encryption code;

an image quality evaluation portion of the instructions operative to evaluate the quality of the restored host image and generate a control signal becoming a first logic state if the quality of the restored host image is less than a predetermined level, and generate a second logic state if the restored host image is not less than the predetermined level;

a second discrete wavelet transform portion of the instructions operative to perform a discrete wavelet transform on the restored host image in response to the first logic state control signal to obtain M×M wavelet coefficients, M being a predetermined positive integer;

a second pseudo-random number generator operative to generate pseudo-random numbers in accordance with a rule corresponding to the restored encryption code;

a coefficient separating portion of the instructions operative to obtain separating location data representing the N×N replacing locations using the pseudo-random numbers, N being another predetermined integer smaller than M, and separate N×N wavelet coefficients corresponding to the N×N separating locations from M×M wavelet coefficients;

a second inverse discrete wavelet transform portion of the instructions operative to perform an inverse discrete wavelet transform on the N×N wavelet coefficients to generate a restored signature image;

an image scale conversion portion of the instructions operative to increase the scale of the restored signature image into that of the host image; and an image selection portion of the instructions operative to select a scale-increased signal image in response to the first logic state control signal, and select the restored host image in response to the second logic state control signal to output a host image.

7. A computer readable medium including program codes executable by a computer to perform a digital image coding method using watermarking, comprising the steps of:

(a) performing a discrete wavelet transform on a host image to be transmitted thereon, thereby outputting M×M discrete wavelet coefficients where M is a predetermined positive integer;

(b) extracting, in order of significance, a predetermined percentile of the M×M wavelet coefficients, beginning with the most significant coefficient;

(c) generating pseudo-random numbers in accordance with a rule corresponding to a predetermined encryption code; and (d) obtaining replacing location data representing the replacing locations of N×N pixels, where N is a predetermined positive integer smaller than M; and (e) replacing and combining coefficients of N×N replacing is locations selected among M×M wavelet coefficients with N×N significant wavelet coefficients.

8. The digital image coding method according to claim 7, further comprising the steps of:

performing an inverse discrete wavelet transform on the replaced M×M wavelet coefficients to generate a combined host image; and compressing the combined host image and the N×N pixel location data.

9. The digital image coding method according to claim 7, wherein the predetermined positive integer N is smaller than or equal to 0.5M.

10. A computer readable medium including program codes executable by a computer to perform a digital image decoding method for decoding bitstreams coded using watermarking, comprising the steps of:

(a) evaluating the quality of a combined host image and determining whether the quality of the combined host image is greater than or equal to a predetermined level;

(b) setting the combined host image as a host image if it is determined in step (a) that the quality of the combined host image is greater than or equal to the predetermined level; and (c) setting as a host image a signature image embedded in the combined host image in secrecy if it is determined in step (a) that the quality of the combined host image is lower than the predetermined level.

11. The digital image decoding method according to claim 10, further comprising the step of decompressing the compressed bitstreams to restore a combined host image and a predetermined encryption code.

12. The digital image decoding method according to claim 10, wherein the step (c) comprises the steps of:

performing discrete wavelet transform on the restored host image to obtain M×M wavelet coefficients, M being a predetermined positive integer;

generating pseudo-random numbers in accordance with a predetermined rule corresponding to the restored encryption code;

obtaining separating location data representing the N×N replacing locations using the pseudo-random numbers, N being another predetermined integer smaller than M;

separating N×N wavelet coefficients corresponding to the N×N separating locations from M×M wavelet coefficients;

performing inverse discrete wavelet transform on the N×N wavelet coefficients to generate a restored signature image;

converting the scale of the restored signature image into that of the host image; and setting the scale-converted signature image as a host image.

13. A computer readable medium including program codes executable by a computer to perform a digital image coding method using watermarking, the method comprising the steps of:

(a) performing a discrete wavelet transform on a host image to be transmitted thereon, thereby outputting M×M discrete wavelet coefficients where M is a predetermined positive integer;

(b) extracting, in order of significance, a predetermined percentile of the M×M wavelet coefficients, beginning with the most significant coefficient;

(c) generating pseudo-random numbers in accordance with a rule corresponding to a predetermined encryption code; and (d) obtaining replacing location data representing the replacing locations of N×N pixels, where N is a predetermined positive integer smaller than M; and (e) replacing and combining coefficients of N×N replacing locations selected among M×M wavelet coefficients with N×N significant wavelet coefficients.

14. The digital image coding method as recited in claim 13 wherein the digital image coding method further comprising the steps of:

performing an inverse discrete wavelet transform on the replaced M×M wavelet coefficients to generate a combined host image; and compressing the combined host image and the N×N pixel location data.

15. The digital image coding method as recited in claim 13, wherein according to the digital image coding method the predetermined positive integer N is smaller than or equal to 0.5M.

16. A computer readable medium including program codes executable by a computer to perform a digital image decoding method for decoding bitstreams coded using watermarking, the method comprising the steps of:

(a) evaluating the quality of a combined host image and determining whether the quality of the combined host image is greater than or equal to a predetermined level;

(b) setting the combined host image as a host image if it is determined in step (a) that the quality of the combined host image is greater than or equal to a predetermined level; and (c) setting as a host image a signature image embedded in the combined host image in secrecy if it is determined in step (a) that the quality of the combined host image is lower than the predetermined level.

17. The digital image coding method as recited in claim 16 wherein the decompressing the compressed bitstreams to restore a combined host image and a predetermined encryption code.

18. The digital image coding method as recited in claim 16 wherein the digital image decoding method step (c) comprises the steps of:

performing discrete wavelet transform on the restored host image to obtain M×M wavelet coefficients, M being a predetermined positive integer;

generating pseudo-random numbers in accordance with a predetermined rule corresponding to the restored encryption code;

obtaining separating location data representing the N×N replacing locations using the pseudo-random numbers, N being another predetermined integer smaller than M;

separating N×N wavelet coefficients corresponding to the N×N separating locations from M×M wavelet coefficients;

performing inverse discrete wavelet transform on the N×N wavelet coefficients to generate a restored signature image;

converting the scale of the restored signature image into that of the host image; and setting the scale-converted signature image as a host image.

* * * * *